(12) United States Patent
Hester et al.

(10) Patent No.: US 10,217,478 B2
(45) Date of Patent: Feb. 26, 2019

(54) LINEAR AND ROTATIONAL ADJUSTMENT SYSTEMS

(71) Applicant: Seagate Technology LLC, Cupertino, CA (US)

(72) Inventors: Grant N. Hester, Longmont, CO (US); Shawn A. Ruden, Shakopee, MN (US); Bryan C. Roberts, Prior Lake, MN (US); Bradley E. Rowell, Plymouth, MN (US); Kevin J. Spiczka, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 478 days.

(21) Appl. No.: 14/796,668

(22) Filed: Jul. 10, 2015

(65) Prior Publication Data

US 2017/0011760 A1 Jan. 12, 2017

(51) Int. Cl.
*B23P 19/10* (2006.01)
*G11B 5/48* (2006.01)
*G05B 19/00* (2006.01)

(52) U.S. Cl.
CPC ............ *G11B 5/4813* (2013.01); *G05B 19/00* (2013.01)

(58) Field of Classification Search
CPC ............ B25B 1/00; B25B 1/04; B25B 1/2426
See application file for complete search history.

(56) References Cited

U.S. PATENT DOCUMENTS

| | | | |
|---|---|---|---|
| 3,021,882 A | 2/1962 | Knoll et al. | |
| 3,948,502 A * | 4/1976 | Waller | B25B 5/062 269/27 |
| 4,164,344 A * | 8/1979 | Deragne | B25B 5/061 269/27 |
| 4,265,434 A * | 5/1981 | Hamilton | B25B 5/061 269/27 |
| 4,351,516 A * | 9/1982 | Ersoy | B25B 5/062 269/27 |
| 4,560,152 A * | 12/1985 | Miller | B25B 5/062 269/24 |
| 4,881,435 A | 11/1989 | Hansson | |
| 5,013,015 A * | 5/1991 | Fatheree | B25B 5/062 269/24 |
| 6,113,086 A * | 9/2000 | Yonezawa | B25B 5/06 269/24 |
| 6,481,093 B1 | 11/2002 | Ruden et al. | |
| 7,458,282 B1 | 12/2008 | Wuester, Sr. et al. | |
| 7,506,553 B1 | 3/2009 | Panyavoravaj | |
| 7,549,204 B1 | 6/2009 | Vangal-Ramamurthy et al. | |
| 8,424,418 B1 | 4/2013 | Wuester, Sr. et al. | |

(Continued)

*Primary Examiner* — Lee D Wilson
(74) *Attorney, Agent, or Firm* — Mueting, Raasch & Gebhardt, P.A.

(57) ABSTRACT

Systems and methods may include a motor and an output shaft apparatus. The output shaft apparatus may be configured to position a manufacturing component using the motor. The output shaft apparatus may move linearly along a longitudinal axis and/or rotationally about the longitudinal axis. The system may also include an engagement apparatus coupling the motor to the output shaft apparatus. The engagement apparatus may be configured in a linear configuration for linearly moving the output shaft apparatus or a rotational configuration for rotationally moving the output shaft apparatus.

10 Claims, 8 Drawing Sheets

(56) References Cited

U.S. PATENT DOCUMENTS

| | | | |
|---|---|---|---|
| 2002/0122273 A1* | 9/2002 | Xia | G11B 5/6005 360/99.18 |
| 2009/0152784 A1* | 6/2009 | Yonezawa | B25B 5/062 269/32 |
| 2009/0302517 A1* | 12/2009 | Patel | B25B 1/22 269/71 |
| 2017/0011760 A1* | 1/2017 | Hester | G05B 19/00 |

* cited by examiner

LINEAR AND ROTATIONAL ADJUSTMENT SYSTEMS

SUMMARY

An exemplary system may include a motor, an output shaft apparatus, and an engagement apparatus coupling the motor to the output shaft apparatus. The output shaft apparatus may extend along a longitudinal axis and may be configured to be removably couplable to a manufacturing component and to at least position the manufacturing component with respect to an assembly using the motor for coupling the manufacturing component to the assembly. The engagement apparatus may also be configurable between a linear configuration and a rotational configuration. The output shaft apparatus may be linearly movable along the longitudinal axis using the motor to linearly move the manufacturing component when the engagement apparatus is configured in the linear configuration. The output shaft apparatus may also be rotationally movable about the longitudinal axis using the motor to rotationally move the manufacturing component about the longitudinal axis when the engagement apparatus is configured in the rotational configuration.

An exemplary apparatus may include a motor and an output shaft apparatus. The motor may include a motor shaft that may be configured to provide a rotational force. The output shaft apparatus may extend along a longitudinal axis and may be configured to be removably couplable to a manufacturing component, to at least position the manufacturing component with respect to an assembly using the motor, for coupling the manufacturing component to the assembly. The output shaft apparatus may be linearly movable along the longitudinal axis using the rotational force provided by the motor shaft to linearly move the manufacturing component. The output shaft apparatus may also be rotationally movable about the longitudinal axis using the rotational force provided by the motor shaft to rotationally move the manufacturing component.

An exemplary method may include rotating a motor shaft of a motor to provide a rotational force. The method may further include coupling a manufacturing component to an output shaft apparatus that may extend along a longitudinal axis. The method may also include positioning the manufacturing component with respect to an assembly using the motor shaft of the motor for coupling the manufacturing component to the assembly. The positioning the manufacturing component may include moving the output shaft apparatus linearly along the longitudinal axis using the rotational force provided by the motor shaft to linearly move the manufacturing component. The positioning the manufacturing component may further include moving the output shaft apparatus rotationally about the longitudinal axis using the rotational force provided by the motor shaft to rotationally move the manufacturing component.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

DETAILED DESCRIPTION

The present disclosure relates to the positioning of at least one manufacturing component relative to an assembly. More specifically, the present disclosure relates to systems, apparatus, structures, and methods for positioning at least one manufacturing component (e.g., manufacturing component structure, head stack assembly, fastener, etc.) that may be removably couplable to an output shaft apparatus (e.g., output shaft structure, driver bit, head stack fork, etc.). The output shaft apparatus may be linearly movable along a longitudinal axis and rotationally movable about the longitudinal axis. The output shaft apparatus may be configured to position the at least one manufacturing component (e.g., manufacturing structure) with respect to an assembly (e.g., assembly structure, storage device assembly, hard drive assembly, etc.) using a motor (e.g., motor structure) to move the at least one manufacturing component linearly and rotationally and further, may be used to couple the manufacturing component to the assembly. In at least one embodiment, an engagement apparatus (e.g., engagement structure) may couple the motor to the output shaft apparatus and translate the rotational motion of the motor to linear and rotational movement of the output shaft apparatus.

The positioning of the manufacturing components with respect to assemblies may be complicated processes by which an apparatus is moved in multiple directions in order to precisely place the manufacturing components relative to the assemblies. In some embodiments, the whole system or many portions of the system may be configured to move to accomplish positioning of the manufacturing components. In other embodiments, only some portions of the system move to position the manufacturing components. In other words, one or more portions of a system may remain stationary while one or more portions of the system may move along with the manufacturing components to position and/or couple the manufacturing components. For example, the output shaft apparatus may be configured to move in multiple directions to position the manufacturing components while the motor driving the output shaft apparatus remains stationary. Limiting motion to the output shaft apparatus may simplify the control of the system because, e.g., the output shaft apparatus may move independent of the motor (and, e.g., other portions of the system) to position the manufacturing components relative to the assemblies.

Further, manufacturing components may need to be precisely positioned and/or placed due to tight constraints in the assembly of, e.g., a storage device, a hard drive, etc. Minor positional changes may be made in order to avoid undesired contact between the manufacturing components and the assemblies and/or to prevent damage to the manufacturing components or the assemblies during installation. For example, a storage device manufacturing component may be rotated to a specific angle before being inserted into a storage device assembly to be coupled to the storage device assembly to prevent damage to both the storage device manufacturing component and the storage device assembly. In one or more embodiments, it may be described that the manufacturing component may move linearly and rotationally to prevent the manufacturing component from "crashing" into the storage device assembly. Additionally, for example, an output shaft assembly of the system may move linearly and close to the storage device manufacturing component to better align the output shaft apparatus with the storage device manufacturing component.

Current systems may include multiple motors that control the various directions in which the systems, or at least a portion of the systems, may move. The present disclosure describes exemplary systems that may use one motor to position a manufacturing component by moving the output shaft apparatus, and the manufacturing component coupled thereto, linearly and rotationally. Specifically, the present disclosure may describe exemplary systems that use one motor to move a manufacturing component linearly along a longitudinal axis and rotationally about the same longitudinal axis.

The exemplary systems may translate motion (e.g., rotational motion) from the motor into both linear and rotational motion to move the output shaft apparatus to position a manufacturing component, which is coupled to the output shaft apparatus relative to an assembly. For example, any suitable apparatus or structure may be used to translate the motion of the motor into both linear movement and rotational movement of the output shaft apparatus. In one or more embodiments, the system may include more than one motor to position manufacturing components (e.g., along with the rest of the system) but a single motor to move the output shaft apparatus linearly and rotationally. For example, the system may be configured to move in a variety of directions using the additional motors while the output shaft apparatus moves linearly and rotationally using a single motor.

The exemplary systems may include an engagement apparatus that may act as an intermediary coupled to both of the motor and the output shaft apparatus to produce or provide both a linear motion and a rotational motion to move the output shaft apparatus. Any suitable apparatus may be used as the engagement apparatus to translate the motion of the motor (e.g., rotational movement) to both a linear motion and a rotational motion of the output shaft apparatus. The engagement apparatus may include multiple portions to manipulate the motion of the motor to result in the desired movement of the output shaft apparatus (e.g., linear movement, rotational movement, etc.). The inclusion of the engagement apparatus may allow the resultant motion of the output shaft apparatus to be independent from a portion of the system that constrains the motor (e.g., the motor housing). In other words, the output shaft apparatus may move relative to the motor housing in a linear and rotational manner due to the engagement apparatus therebetween.

Exemplary systems, apparatus, structures, devices, and methods shall be described with reference to FIGS. 1-7. It will be apparent to one skilled in the art that elements or processes from one embodiment may be used in combination with elements or processes of the other embodiments, and that the possible embodiments of such systems, apparatus, structures, devices, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

Figure 1:
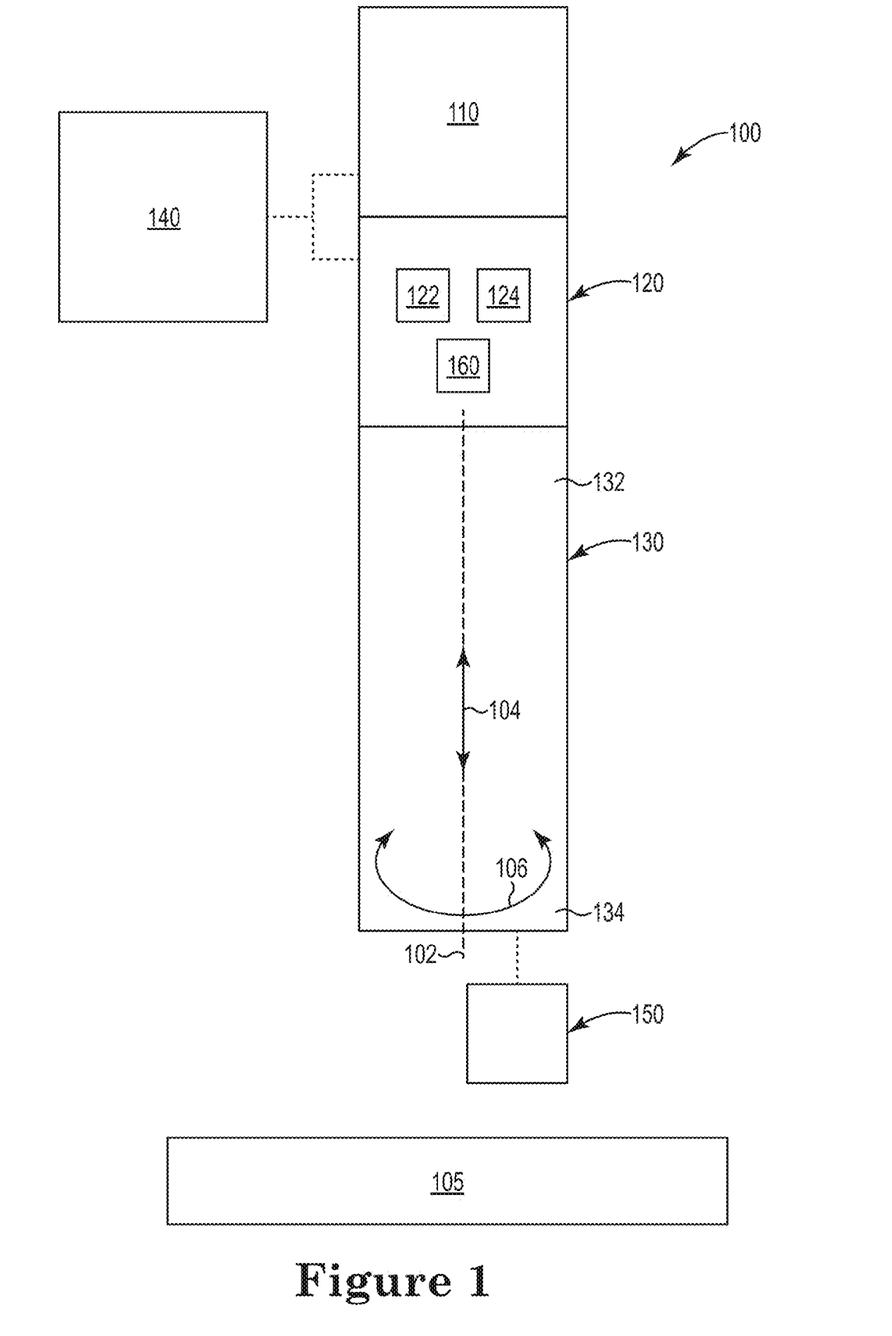
FIG. 1 is a block diagram of an exemplary embodiment.

An exemplary system 100 may include a variety of different structures and components to provide linear and rotational movement to a manufacturing component 150 (e.g., manufacturing component structure) as shown in the block diagram of FIG. 1. For example, the system 100 may include a motor 110 (e.g., motor structure) and an output shaft apparatus 130 (e.g., output shaft structure). The output shaft apparatus 130 (e.g., output shaft structure) may extend along a longitudinal axis 102 and may be configured to be removably couplable to the manufacturing component 150 (e.g., manufacturing component structure). When the output shaft apparatus 130 is not coupled to the manufacturing component 150, the output shaft apparatus 130 may move relative to the manufacturing component 150 in a variety of different ways to align the output shaft apparatus 130 and the manufacturing component 150 such that the output shaft apparatus 130 and the manufacturing component 150 may be coupled. After the output shaft apparatus 130 is appropriately aligned with the manufacturing component 150, the manufacturing component 150 may be coupled to the output shaft apparatus 130 so that the output shaft apparatus 130 and the manufacturing component 150 move together. Further, the output shaft apparatus 130 and the manufacturing component 150 may move together to align the manufacturing component 150 with respect to an assembly 105 (e.g., assembly structure), e.g., prior to coupling the manufacturing component 150 to the assembly 105. In one or more embodiments, the output shaft apparatus 130 may assist or help in coupling the manufacturing component 150 to the assembly 105.

The manufacturing component 150 may be removably couplable to the output shaft apparatus 130 to allow the output shaft apparatus 130 to easily "pick up" or hold the manufacturing component 150 and deposit or place the manufacturing component 150 within the assembly 105. The manufacturing component 150 may be coupled to the output shaft apparatus 130 at any position on the output shaft apparatus 130 that suits the positioning of the manufacturing component 150. For example, the output shaft apparatus 130 may extend along the longitudinal axis 102 from a proximal region 132 proximate the motor 110 to a distal region 134 farther from the motor 110 than the proximal region 132. The manufacturing component 150 may be removably couplable to the output shaft apparatus 130 at any position, e.g., closer to the distal region 134 than the proximal region 132, closer to the proximal region 132 than the distal region 134, and anywhere between or at the proximal region 132 and the distal region 134. In at least one embodiment, it may be described that the manufacturing component 150 is coupled to the output shaft apparatus 130 proximate the distal region 134. Additionally, the output shaft apparatus 130 may include one or more additional components or structures (e.g., a head stack fork, a driver bit, etc.) to help position and/or couple the manufacturing component 150 to the assembly 105.

The assembly 105 may include a variety of different manufacturable assemblies. As described herein, the assembly 105 may include anything in which a manufacturing component 150 may be positioned and/or coupled. For example, the assembly 105 may include an assembly structure, a hard drive assembly, a solid state drive assembly, a storage device assembly, a head tester assembly, consumer electronics, automobiles, any suitable structure including placement of a part or fastening of a screw, etc. The assembly 105 may move along a conveyor system that moves the assembly 105 to a variety of stations to add a variety of manufacturing components 150 to the assembly 105. Further, precisely positioning and/or coupling manufacturing components 150 to the assembly 105 may be challenging due to the many portions, parts, and/or structures that are included in the assembly 105 and are positioned within the assembly 105. For example, portions, parts, and/or structures of the assembly 105 or the manufacturing component 150 may be damaged if the manufacturing component 150 is not precisely placed within the assembly 105. In one or more embodiments, the manufacturing component 150 may include, e.g., a head stack assembly, a fastener, a clamp, a magnetic assembly, a disc, a voice coil assembly, etc. Further, the output shaft apparatus 130 may be controlled (e.g., by a control apparatus 140) to better maneuver the manufacturing component 150 to be positioned within the assembly 105.

The output shaft apparatus 130 may be configured to move in a variety of different directions to precisely position and/or couple the manufacturing component 150 to the assembly 105. In one or more embodiments, the output shaft apparatus 130 may be configured to move independently from other portions of the system 100. In other words, the output shaft apparatus 130 may move relative to other portions of the system 100 or the output shaft apparatus 130 may move while other portions of the system 100 remain stationary. For example, the output shaft apparatus 130 may be configured to move independently of the motor 110 and/or a control apparatus 140 (e.g., a control structure) of the system 100. Furthermore, in one or more embodiments, the output shaft apparatus 130 may include, e.g., a head stack fork, a head stack assembly support, a driver bit, a vacuum cup, a magnet coil, a voice coil assembly support, etc. proximate, e.g., the distal region 134.

The system 100 may include one or more motors coupled to output shaft apparatus 130 to move the output shaft apparatus 130 in various directions. As shown in FIG. 1, motor 110 is coupled to the output shaft apparatus 130. In one or more embodiments, the motor 110 may include, e.g., a servo motor, a stepper motor, a rotary air cylinder, etc. The motor 110 may be coupled to the output shaft apparatus 130 such that the motor 110 moves the output shaft apparatus 130 in specific directions. For example, the output shaft apparatus 130 may be configured to move linearly 104 and rotationally 106 using the motor 110. Specifically, the output shaft apparatus 130 may move linearly 104 along the longitudinal axis 102 and rotationally 106 about the longitudinal axis 102 using the motor 110. The linear 104 and rotational 106 movements may allow for an adjustment (e.g., a fine adjustment) of the output shaft apparatus 130 relative to the assembly 105.

In one or more embodiments, the longitudinal axis 102 may be described as extending from the motor 110 to the output shaft apparatus 130. In one or more embodiments, the longitudinal axis 102 may be described as, e.g., normal to a ground surface, normal to a conveyor belt, normal to a plane in which the assembly 105 lies, etc. when the system 100 is in operation. In one or more embodiments, the output shaft apparatus 130 may move relative to the motor 110. For example, the output shaft apparatus 130 may be described as being configured to move towards and away from the motor 110. Specifically, the output shaft apparatus 130 may move linearly 104 towards and away from the motor 110 along the longitudinal axis 102. Additionally, in one or more embodiments, the output shaft apparatus 130 may move in conjunction with the motor 110. For example, the output shaft apparatus 130 and the motor 110 may move together due to some other external component (e.g., an alternative motor, hydraulic apparatus or structure, etc. not shown in FIG. 1). Moving the output shaft apparatus 130 with the motor 110 may allow for an adjustment (e.g., a gross adjustment) of the system 100 to help better position the manufacturing component 150, which may be coupled to the output shaft apparatus 130, relative to the assembly 105.

The motor 110 may include a motor shaft 112 that produces a force to drive the output shaft apparatus 130. For example, the motor shaft 112 may provide a rotational force that is used to drive the output shaft apparatus 130 in both a linear direction 104 and a rotational direction 106 as described herein. The output shaft apparatus 130 may be rotationally 106 movable about the longitudinal axis 102 using the rotational force provided by the motor shaft 112. For example, the rotational force of the motor shaft 112 may directly correlate to the rotational motion 106 of the output shaft apparatus 130 (e.g., the interaction between the motor shaft 112 and the output shaft apparatus 130 may be geared or similar to a transmission). In other words, the output shaft apparatus 130 may rotate in the same direction as the rotational force of the motor shaft 112. Alternatively, the output shaft 130 may rotate in the opposite direction as the rotational force of the motor shaft 112. Additionally, the rotational force of the motor shaft 112 may translate to a linear motion 104 of the output shaft apparatus 130. In other words, the output shaft apparatus 130 may be linearly movable along the longitudinal axis 102 using the rotational force provided by the motor shaft 112.

The system 100 may also include an engagement apparatus 120 (e.g., engagement structure) coupling the motor 110 to the output shaft apparatus 130. The engagement apparatus 130 may be configured to translate the motion of the motor 110 in a variety of ways to the output shaft apparatus 130. The engagement apparatus 120 may include any suitable apparatus that may couple the motor 110 to the output shaft apparatus 130 while allowing relative motion between the motor 110 and the output shaft apparatus 130.

Specifically, the engagement apparatus 120 may include any suitable apparatus that may change the motion of the motor 110 to linear 104 or rotational 106 motion of the output shaft apparatus 130. For example, the engagement apparatus 120 may be configurable between at least a linear configuration and a rotational configuration. In one or more embodiments, the engagement apparatus 120 may be predisposed to be configured in the linear configuration to linearly 104 move the manufacturing component 150. For example, the engagement apparatus 120 may be described as being configured in the linear configuration to linearly 104 move the manufacturing component 150, e.g., as a default, without external input, as a natural state, etc. In other embodiments, the engagement apparatus 120 may be predisposed to be configured in the rotational configuration to rotationally 106 move the manufacturing component 150. For example, the engagement apparatus 120 may be described as being configured in the rotational configuration to rotationally 106 move the manufacturing component 150, e.g., as a default, without external input, as a natural state, etc.

The output shaft apparatus 130 may be linearly 104 movable along the longitudinal axis 102 using the motor 110 when the engagement apparatus 120 is configured in the linear configuration. In one or more embodiments, when the manufacturing component 150 is coupled to the output shaft apparatus 130, the manufacturing component 150 is also linearly 104 movable along the longitudinal axis 102 (e.g., with the output shaft apparatus 130) when the engagement apparatus 120 is configured in the linear configuration. Furthermore, the output shaft apparatus may be rotationally 106 movable about the longitudinal axis 102 using the motor 110 when the engagement apparatus 120 is configured in the rotational configuration. In one or more embodiments, when the manufacturing component 150 is coupled to the output shaft apparatus 130, the manufacturing component 150 is also rotationally 106 movable about the longitudinal axis 102 (e.g., with the output shaft apparatus 130) when the engagement apparatus 120 is configured in the rotational configuration.

Figure 3:
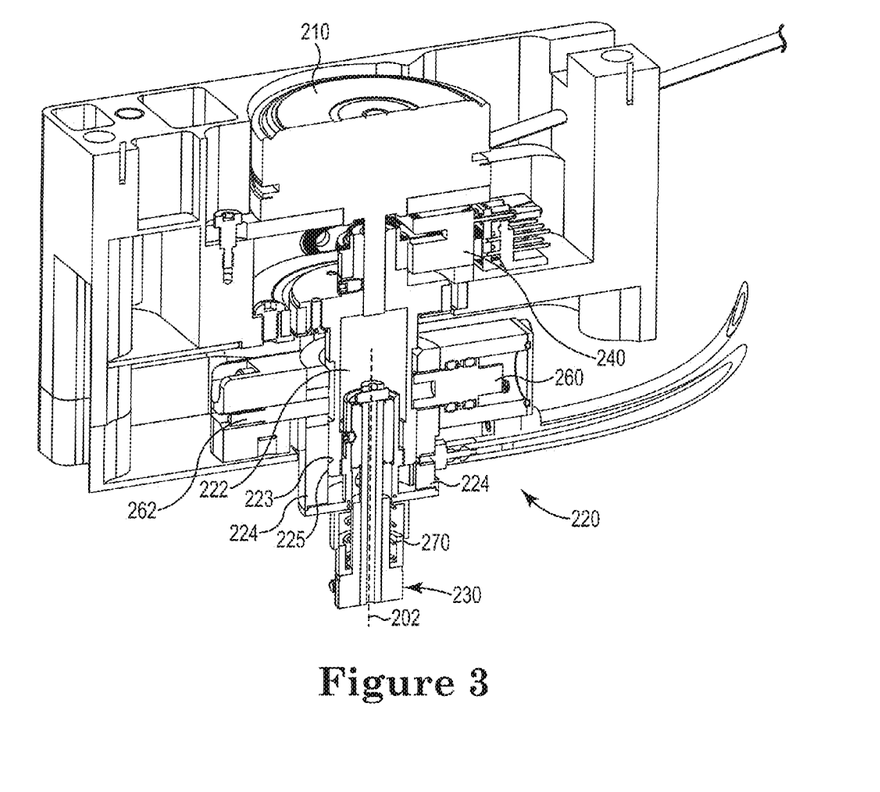
FIG. 3 is a cross-sectional view of the exemplary embodiment of FIG. 2 taken across line 3-3.
Figure 6:
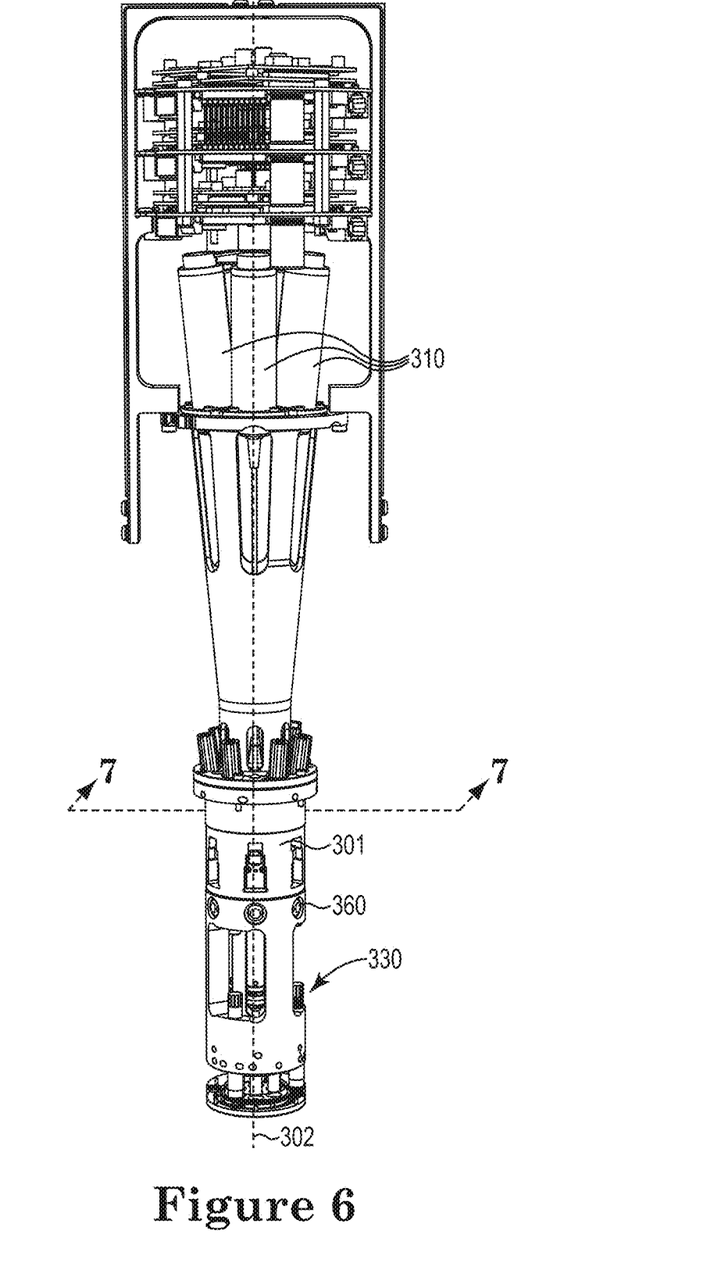
FIG. 6 is a side view of yet another exemplary embodiment configured for coupling screws to assemblies.
Figure 7:
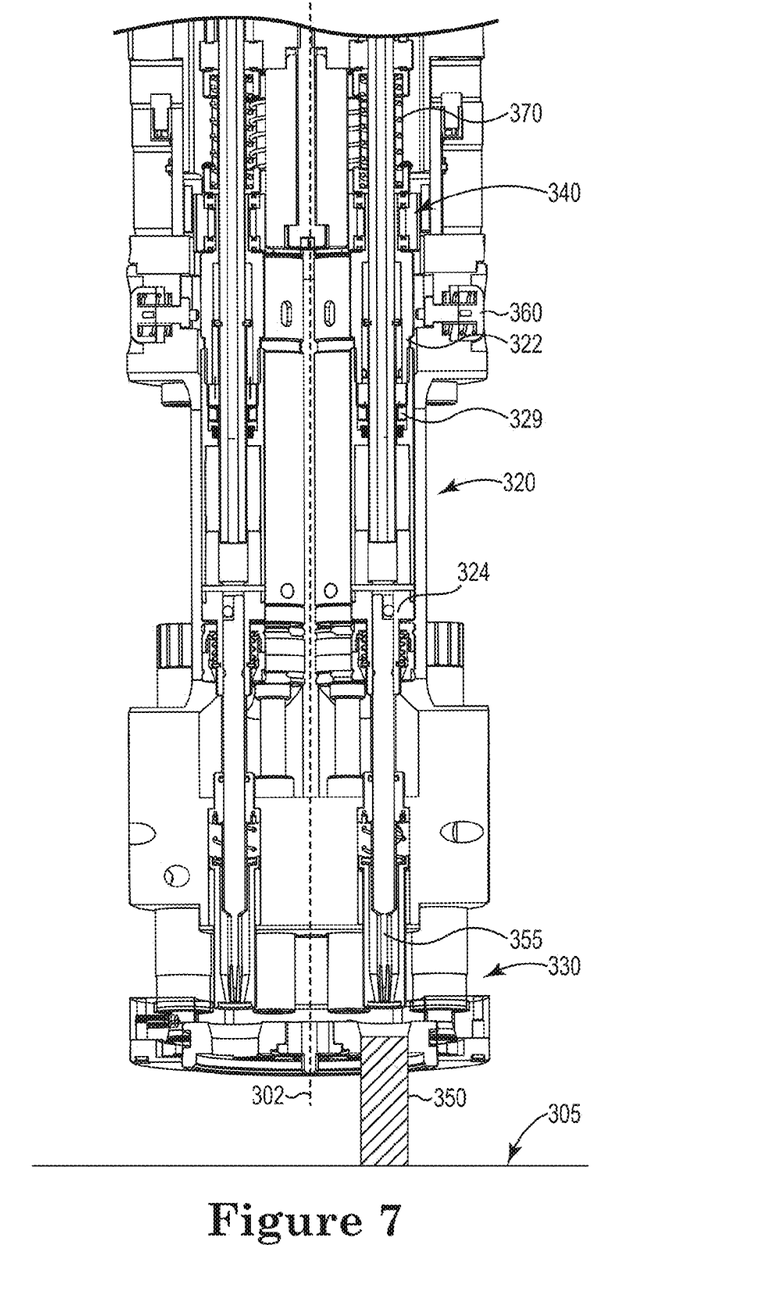
FIG. 7 is an enlarged cross-sectional view of the exemplary embodiment of FIG. 6 taken across line 7-7.

The engagement apparatus 120 (e.g., engagement structure) may also include multiple portions that may be configurable into the linear configuration and the rotational configuration. For example, the engagement apparatus 120 may include a first portion 122 (e.g., first portion 222 as shown in FIG. 3 and first portion 322 as shown in FIGS. 6-7) and a second portion 124 (e.g., second portion 224 as shown in FIG. 3 and second portion 324 as shown in FIGS. 6-7). Further, the engagement apparatus 120 may include any number of portions in between the first portion 122 and the second portion 124 to perform the functionalities of the engagement apparatus 120.

The first portion 122 of the engagement apparatus 120 may be fixedly coupled to the motor shaft 112 (or, e.g., any part of the motor 110) and the second portion 124 of the engagement apparatus 120 may be fixedly coupled to the output shaft apparatus 130. In other words, if the motor 110 includes a rotating motor shaft 112, the first portion 122 of the engagement apparatus 120 is configured to rotate along with the motor shaft 112 while the second portion 124 of the engagement apparatus 120 is configured to move along with the output shaft apparatus 130. The first and second portions 122, 124 of the engagement apparatus 120 may interact to provide a rotational configuration and a linear configuration of the engagement apparatus 120. For example, the first and second portions 122, 124 of the engagement apparatus 120 may include threaded regions (e.g., as shown in FIG. 3) at the intersection between the first and second portions 122, 124 of the engagement apparatus 120. The threaded regions of the first and second portions 122, 124 of the engagement apparatus 120 may assist in configuring the engagement apparatus 120 into the linear configuration and the rotational configuration. Other types of interactions between the first and second portions 122, 124 of the engagement apparatus 120 used to configure the engagement apparatus 120 into the linear and rotational configurations may include, e.g., a lead screw, a wedge, etc.

In one or more embodiments, when the first portion 122 of the engagement apparatus 120 is fixedly coupled to the second portion 124 of the engagement apparatus 120, the second portion 124 of the engagement apparatus 120 and the output shaft apparatus 130 may move (e.g., rotate) along with the first portion 122 of the engagement apparatus 120 and the motor shaft 112. Therefore, when the first portion 122 of the engagement apparatus 120 is fixedly coupled to the second portion 124 of the engagement apparatus 120, the engagement apparatus 120 may be described as being configured in the rotational configuration because, e.g., the output shaft apparatus 130 may move rotationally.

When the first portion 122 of the engagement apparatus 120 is rotatable relative to the second portion 124 of the engagement apparatus 120, the engagement apparatus 120 may be described as being configured in the linear configuration. In other words, when the engagement apparatus 120 is configured in the linear configuration, the first portion 122 of the engagement apparatus 120 may rotate while the second portion 124 of the engagement apparatus 120, and thus, the output shaft apparatus 130, does not rotate (e.g., restricted from rotating). Instead, the second portion 124 of the engagement apparatus 120 may be configured to move linearly because the second portion 124 of the engagement apparatus 120 does not rotate. For example, because the first portion 122 of the engagement apparatus 120 rotates while the second portion 124 of the engagement apparatus 120 remains stationary, the threaded regions intersecting between the first and second portions 122, 124 may cause the second portion 124 to move linearly relative to the first portion 122. Specifically, a helical structure of the threaded regions may convert the rotational movement of the first portion 122 of the engagement apparatus 120 to linear movement 104 of the second portion 124 of the engagement apparatus 120.

The engagement apparatus 120 may further include a switch apparatus 160 (e.g., switch structure, switch apparatus 260 as shown in FIG. 3, switch apparatus 360 as shown in FIGS. 6-7) configured to place the engagement apparatus 120 in at least one of the linear configuration and the rotational configuration. For example, the switch apparatus 160 (e.g., switch structure) may be configured to interact with at least one or both of the first and second portions 122, 124 of the engagement apparatus 120 in order to configure the engagement apparatus 120 in the linear and rotational configurations. Specifically, in one or more embodiments, the switch apparatus 160 may be configured to selectively fixedly couple the first portion 122 of the engagement apparatus 120 to the second portion 124 of the engagement apparatus 120 to configure the engagement apparatus 120 in the rotational configuration. Also, in one or more embodiments, the switch apparatus 160 may be configured to selectively restrict rotation of the second portion 124 of the engagement apparatus 120 relative to the first portion 122 of the engagement apparatus 120 to configure the engagement apparatus 120 in the linear configuration.

The system 100 may also include a control apparatus 140 (e.g., control structure) connected or operatively coupled to one or more components of the system 100 as shown in FIG. 1. For example, control apparatus 140 may be connected to the motor 110 and/or the engagement apparatus 120. The control apparatus 140 may be connected to the motor 110 to control the speed and directional output of the motor 110. The control apparatus 140 may be connected to the engagement apparatus 120 to configure the engagement apparatus 120 in the linear configuration or the rotational configuration. For example, the control apparatus 140 may be connected to the switch apparatus 160 to configure the engagement apparatus 120 in the linear configuration and the rotational configuration. In one or more embodiments, the control apparatus 140 may be coupled to one or more portions, parts, and/or structures of the system 100 (e.g., the motor 110, engagement apparatus 120, etc.) such that the control apparatus 140 moves along with those portions, parts, and/or structures of the system 100 when moved. Alternatively, the control apparatus 140 may be coupled to one or more external features such that the control apparatus 140 remains stationary as other portions, parts, and/or structures of the system 100 (e.g., the motor 110, the engagement apparatus 120, etc.) move. Additionally, the control apparatus 140 may transmit signals to the motor 110 and/or engagement apparatus 120 through, e.g., wireless connections, cables, slip rings, etc.

The methods and/or logic described in this disclosure, including those attributed to the systems 100, or various constituent components (e.g., the control apparatus 140), may be implemented, at least in part, in hardware, software, firmware, or any combination thereof. For example, various aspects of the techniques may be implemented within one or more processors, including one or more microprocessors, microcontrollers, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry.

Such hardware, software, and/or firmware may be implemented within the same system or within separate systems to support the various operations and functions described in this disclosure. In addition, any of the described components may be implemented together or separately as discrete but interoperable logic devices.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

The control apparatus 140 (e.g., control structure) may be configured to position the output shaft apparatus 130 and the manufacturing component 150 relative to the assembly 105 and determine where the output shaft apparatus 130 should move to correctly position the manufacturing component 150 relative to the assembly 105. In other words, the control apparatus 140 may be able to identify the location of the manufacturing component 150 as well as instruct the motor 110 and the engagement apparatus 120 to further move the manufacturing component 150 to the correct location. The control apparatus 140 may track the output shaft apparatus 130 and/or the manufacturing component 150 through, e.g., a vision system, an encoder, an inductive sensor, a capacitive sensor, a photoelectric sensor, etc.

The control apparatus 140 may also be configured to measure linear displacement and rotational displacement of the output shaft apparatus 130. For example, the control apparatus 140 may be configured to measure the linear displacement of the output shaft apparatus 130 when the engagement apparatus 120 is configured in the linear configuration. Also, the control apparatus 140 may be configured to measure the rotational displacement of the output shaft apparatus 130 when the engagement apparatus 120 is configured in the rotational configuration. Further, the control apparatus 140 may be configured to control the linear movement 104 and the rotational movement 106 of the output shaft apparatus 130 based on at least the measured linear displacement or the measured rotational displacement. In other words, the location of the output shaft apparatus 130 may be modified due to the linear displacement and rotational displacement of the output shaft apparatus 130 measured by the control apparatus 140.

Although not shown in FIG. 1, the system 100 may further include a compliance apparatus (e.g., compliance structure, compliance apparatus 270 as shown in FIG. 3, compliance apparatus 370 as shown in FIG. 7) that may be configured to provide at least some linear compliance for the output shaft apparatus 130 along the longitudinal axis 102. The compliance apparatus (e.g., compliance structure) may be included in or located proximate, e.g., the engagement apparatus 120, output shaft apparatus 130, or therebetween, and provide linear compliance to the output shaft apparatus 130 to help prevent damage to the output shaft apparatus 130 when the output shaft apparatus 130 moves linearly. For example, the compliance apparatus (e.g., compliance structure) may prevent the output shaft apparatus 130 from pressing against the manufacturing component 150 or may prevent the manufacturing component 150 from pressing against the assembly 105 so that the output shaft apparatus 130, the manufacturing component 150, and the assembly 105 may not be damaged. In one or more embodiments, the compliance apparatus may be described as preventing the output apparatus 130 and/or the manufacturing component 150 from "over-traveling" and "crashing" into the manufacturing component 150 and/or the assembly 105. The compliance apparatus may include any suitable apparatus or structure that may provide a compliant or resilient movement of the output shaft apparatus 130 and/or the manufacturing component 150. For example, the compliance apparatus may include a spring, rubber, dampers, shear pads, etc. In one or more embodiments, the system 100 may include multiple compliance apparatus or structures.

Figure 2:
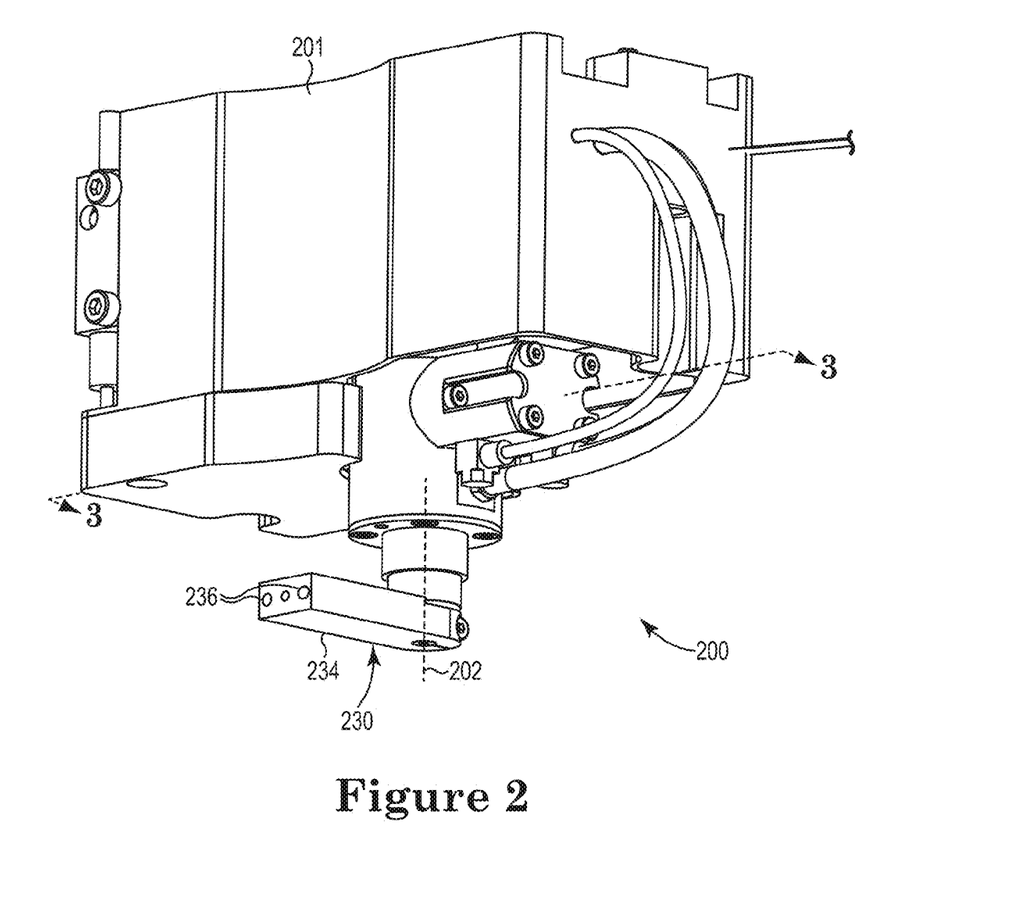
FIG. 2 is a perspective view of another exemplary embodiment configured for positioning a head stack assembly.

An exemplary system 200 for positioning a head stack assembly relative to a storage device assembly (e.g., storage device structure, a hard drive assembly) is illustrated in FIGS. 2-3. As shown in FIG. 2, the system 200 may include a housing 201 (e.g., housing structure) that surrounds at least a portion of at least one of a motor 210 (e.g., motor structure), an engagement apparatus 220 (e.g., engagement structure), and an output shaft apparatus 230 (e.g., output shaft structure) extending along a longitudinal axis 202. A portion of the output shaft apparatus 230 (e.g., output shaft structure) may protrude from the housing 201 (e.g., housing structure) to be coupled to the manufacturing component. In one or more embodiments, the output shaft apparatus 230 may define at least one aperture 236 located at a distal region 234 of the output shaft apparatus 230. The at least one aperture 236 may be configured to receive an output shaft tool to help position the manufacturing component as described further herein. The at least one aperture 236 may receive the output shaft tool by any suitable means that couples the output shaft apparatus 230 to the output shaft tool. For example, the output shaft apparatus 230 may be coupled to the output shaft tool through the at least one aperture 236 using a vacuum, a fastener, a clip, a screw, etc.

As shown in FIG. 3, which is a cross-section of FIG. 2 taken across line 3-3, the system 200 may include a motor 210 (e.g., motor structure) coupled to a first portion 222 of the engagement apparatus 220 (e.g., engagement structure) and a second portion 224 of the engagement apparatus 220 (e.g., engagement structure) coupled to the output shaft apparatus 230 (e.g., output shaft structure). The first portion 222 of the engagement apparatus 220 and the second portion 224 of the engagement apparatus 220 may each include corresponding, engaged threaded surfaces 223, 225, respectively, by which the first and second portions 222, 224 interact. The threaded surface 223 of the first portion 222 of the engagement apparatus 220 may interact with the threaded surface 225 of the second portion 224 of the engagement apparatus 220 when the motor 210 rotates because, for example, the motor 210 is fixedly coupled to the first portion 222 of the engagement apparatus 220. The second portion 224 of the engagement apparatus 220 may be selectively restricted from rotating but free to move in a linear direction, therefore, as the first portion 222 of the engagement apparatus 220 rotates the second portion 224 of the engagement apparatus 220 may be restricted from rotating but the threaded surfaces 223, 225 of the first and second portions 222, 224 cause the second portion 224 of the engagement apparatus 230 to move in the linear direction along the longitudinal axis 202. For example, a helical structure of the threaded surfaces 223, 225 may convert the rotational movement of the first portion 222 of the engagement apparatus 220 to linear movement of the second portion 224 of the engagement apparatus 220. Further, the second portion 224 of the engagement apparatus may move linearly away from the motor 210 along the longitudinal axis 202 as the motor 210 rotates in one direction and the second portion 224 of the engagement apparatus 220 may move linearly towards the motor 210 along the longitudinal axis 202 as the motor 210 rotates in the opposite direction.

Also as shown in FIG. 3, the engagement apparatus 220 (e.g., engagement structure) may include a switch apparatus 260 (e.g., switch structure, a brake) configured to fixedly couple the first and second portions 222, 224 of the engagement apparatus 220. In other words, the switch apparatus 260 may be configured to switch the engagement apparatus 220 between the rotational configuration and the linear configuration. The switch apparatus 260 may be configured to operate automatically (by, e.g., linear actuator, a robot, controller, air cylinder, pneumatic actuator, etc.) or manually (by, e.g., user input, a button).

When the switch apparatus 260 (e.g., switch structure) fixedly couples (e.g., engages) the first and second portions 222, 224 of the engagement apparatus 220, the first and second portions 222, 224 of the engagement apparatus 220 may move together. In other words, the engagement apparatus 220 may be configured in the rotational configuration when the switch apparatus 260 fixedly couples the first and second portions 222, 224 of the engagement apparatus 220. Therefore, the second portion 224 of the engagement apparatus 220 may rotate along with the motor 210 and first portion 222 of the engagement apparatus 220 about the longitudinal axis 202 when the switch apparatus 260 is engaged. Consequently, the output shaft apparatus 230 may rotate with the second portion 224 of the engagement apparatus 220 about the longitudinal axis 202 because the output shaft apparatus 230 is fixedly coupled to the second portion 224 of the engagement apparatus 220.

Figure 4:
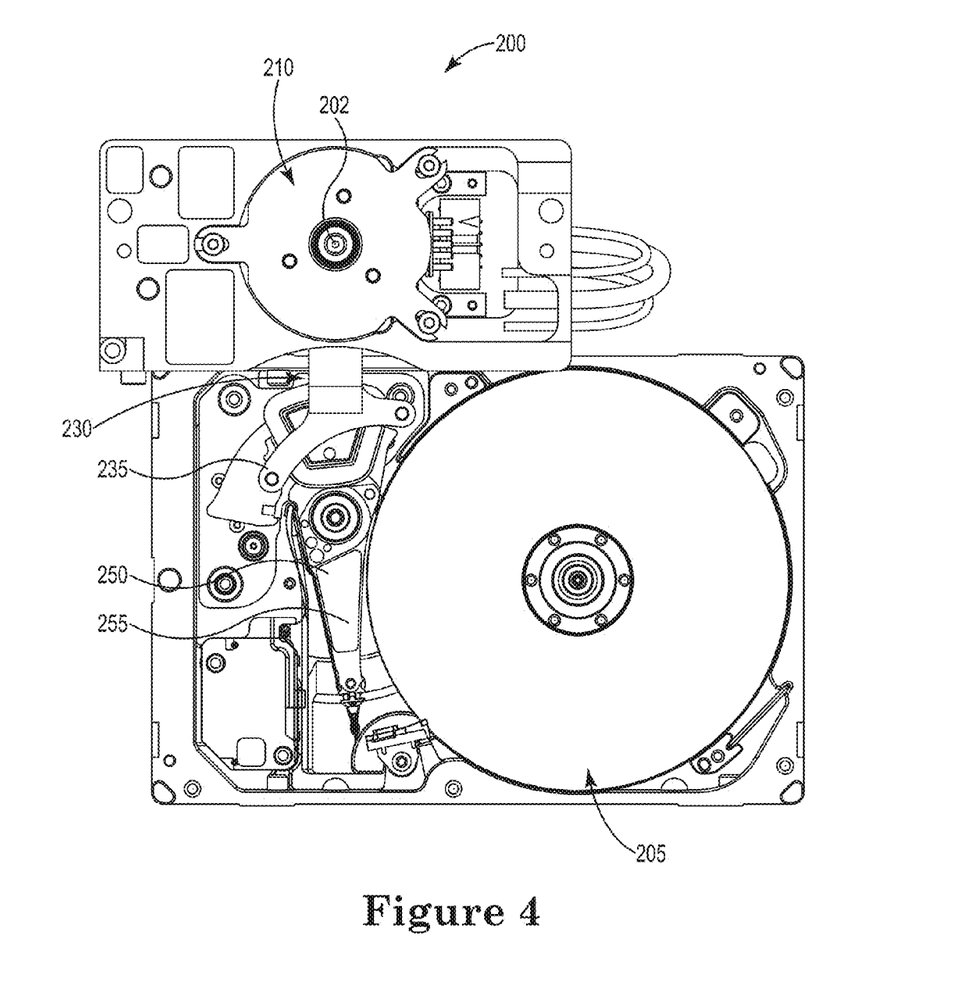
FIG. 4 is a top view of the exemplary embodiment of FIG. 2 and a storage device assembly.
Figure 5:
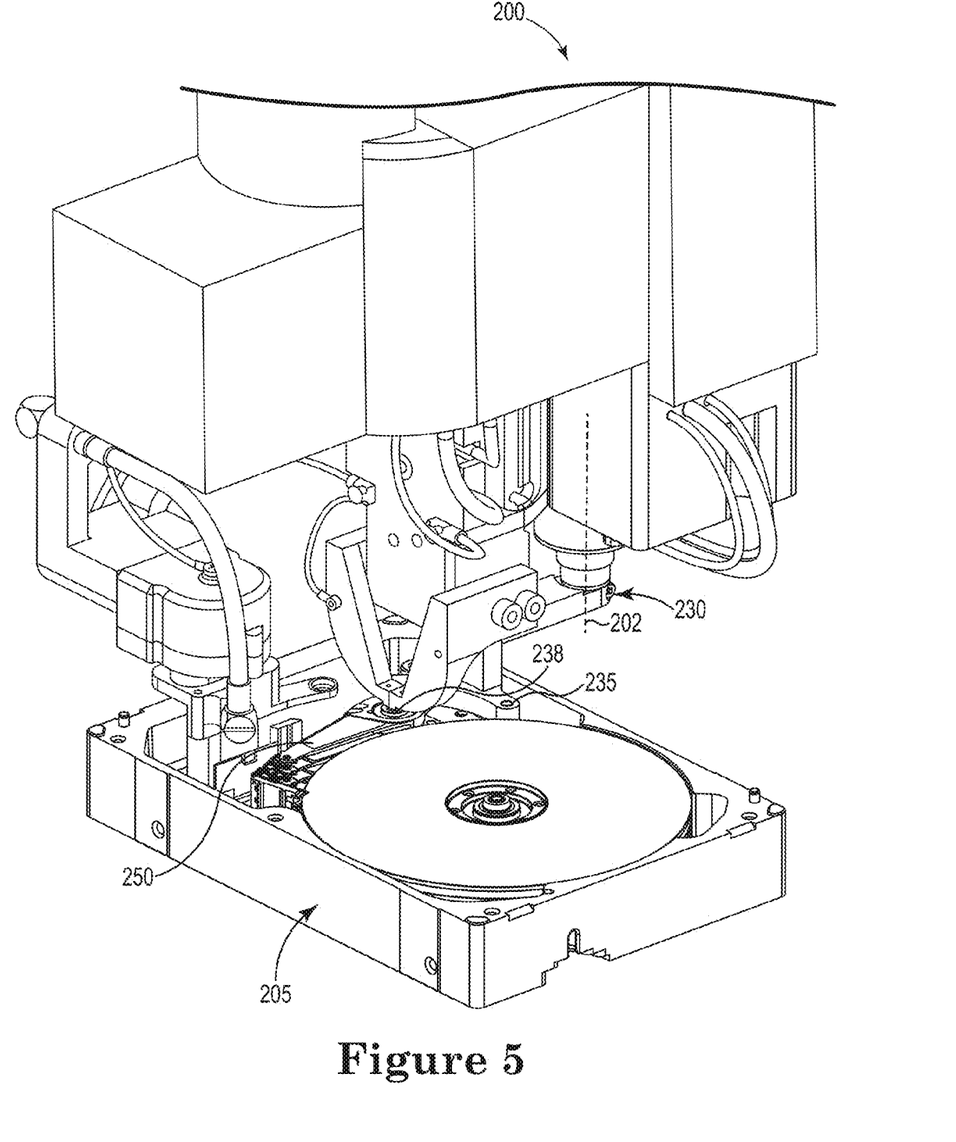
FIG. 5 is a perspective view of the exemplary embodiment of FIG. 2 and a storage device assembly.

Alternatively, when the switch apparatus 260 (e.g., switch structure) is not fixedly coupling (e.g., not engaging) the first and second portions 222, 224 of the engagement apparatus 220, the second portion 224 of the engagement apparatus may be restricted from rotating and instead, may move linearly along the longitudinal axis 202 due to the corresponding threaded surfaces 223, 225 of the first and second portions 222, 224 of the engagement apparatus 220, e.g., because the helical structure of the threaded surfaces 223, 225 may convert rotational movement of the first portion 222 to linear movement of the second portion 224. In other words, the engagement apparatus 220 may be configured in the linear configuration when the switch apparatus 260 is not fixedly coupling the first and second portions 222, 224 of the engagement apparatus 220. In one or more embodiments, the switch apparatus 260 (e.g., the brake) not fixedly coupling the first and second portions 222, 224 of the engagement apparatus 220 may be described as releasing the first portion 222 from the second portion 224. Therefore, the second portion 224 of the engagement apparatus 220 may be restricted from rotating and instead move linearly along the longitudinal axis 202 when the switch apparatus 260 is not engaged. Consequently, the output shaft apparatus 230 may move linearly along the longitudinal axis 202 because the output shaft apparatus 230 is fixedly coupled to the second portion 224 of the engagement apparatus 220. It may be described that the engagement apparatus 220 is pre-disposed in the linear configuration to linearly move the output shaft apparatus 230 (which may be coupled to a head stack assembly 250 as shown in FIGS. 4-5) along the longitudinal axis 202 when the engagement apparatus 220 is configured in the linear configuration (e.g., when the switch apparatus 260 is not engaged). For example, the engagement apparatus 220 may be described as being configured in the linear configuration to linearly move the output shaft apparatus 230, e.g., as a default configuration, without external input, as a natural state, etc.

The engagement apparatus 220 may also include a switch sensor 262 configured to determine the state of the switch apparatus 260. The switch sensor 262 may be operatively coupled to a controller or control apparatus 240 (e.g., control structure). For example, the switch sensor 262 may sense whether or not the switch apparatus 260 is coupling the first and second portions 222, 224 of the engagement apparatus 220. The switch sensor 262 may include, e.g., an optical beam, a proximity sensor, a capacitive sensor, an inductive sensor, etc. The switch sensor 262 may be located anywhere along the engagement apparatus 220 that provides access to determine whether the switch apparatus 262 is engaged or not. As shown in FIG. 3, the switch sensor 262 is located across the first and second portions 222, 224 of the engagement apparatus 220 from the switch apparatus 260.

The output shaft apparatus 230 of the system 200 positioning a head stack assembly 250 in a storage device assembly 205 (e.g., hard drive assembly) is shown in FIGS. 4-5. In one or more embodiments, the head stack assembly 250 may be connected to a flex cable that puts a bias on the head stack assembly 250 and may cause the head stack assembly 250 to undesirably rotate, and in turn may cause the output shaft apparatus 230 to rotate, about the longitudinal axis 202. The biased rotation of the head stack assembly 250 may complicate the process of installing the head stack assembly 250 into the storage device assembly 205 because the head stack assembly 250 may become improperly aligned due to the biased rotation. Controlling the rotational motion of the head stack assembly 250 using the motor 210 of the system 200 may reduce the possibility of any complications related to the flex cable biasing and may further remove the subjective methods of "setting up" the manufacturing equipment.

The system 200 may provide the ability to control the positioning of the head stack assembly 250 within the storage device assembly 205 (e.g., hard drive assembly) at an install position 255 (e.g., an install angle) using the motor 210. Positioning the head stack assembly 250 at the install position 255 may reduce the possibility of damaging the head stack assembly 250 (e.g., the head assembly) and/or media and basedeck components (e.g., a load ramp, separator plates, a disc shroud, etc.) of the storage device assembly 205. In one or more embodiments, the output shaft apparatus 230 may be described as being configured to rotate about the longitudinal axis 202 (e.g., longitudinal axis 202 is illustrated as normal to the page in FIG. 4) in either direction by less than or equal to about, e.g., 5 degrees, 10 degrees, 30 degrees, 45 degrees, 90 degrees, or any range therebetween. In one or more embodiments, the output shaft apparatus 230 may be described as being configured to move linearly along the longitudinal axis 202 in either direction by, e.g., greater than or equal to about 0.25 mm, greater than or equal to about 0.5 mm, greater than or equal to about 1 mm, greater than or equal to about 2 mm, greater than or equal to about 4 mm, greater than or equal to about 6 mm, etc. and/or less than or equal to about 15 mm, less than or equal to about 12 mm, less than or equal to about 10 mm, less than or equal to about 7 mm, less than or equal to about 5 mm, less than or equal to about 3 mm, etc.

As shown in FIGS. 4-5, the output shaft apparatus 230 (e.g., output shaft structure) may include an output extension 235 (e.g., output extension structure, a head stack fork) that is configured to be removably couplable to the head stack assembly 250 (e.g., head stack assembly structure). In one or more embodiments, the system 200 may move to a tray of head stack assemblies 250 to pick up an individual head stack assembly 250 using the output extension 235 using, for example, the motor 210, one or more additional motors (e.g., not the motor 210), etc. The output shaft apparatus 230 may move linearly (e.g., vertically) to accommodate a variety of different height head stack assemblies 250, e.g., automatically. In other words, the output shaft apparatus 230 may be configured (e.g., by linear movement) to properly align multiple head stack assemblies 250 with the storage device assembly 205 regardless of the height of the head stack assembly 250.

The output extension 235 (e.g., output extension structure) may then be positioned over the storage device assembly 205 to initially align the head stack assembly 250 with the storage device assembly 205 using the motor 210. To counteract the natural rotation of the head stack assembly 250 (e.g., due to the flex cable), the motor 210 may rotate the output shaft apparatus 230, which is coupled to the head stack assembly 250, to precisely align the head stack assembly 250 within the storage device assembly 205. For example, the engagement apparatus 220 may be configured in the rotational configuration, and therefore, configured to rotate the head stack assembly 250 to an install position 255.

Additionally, the output shaft apparatus 230 may move linearly (e.g., vertically) to position the head stack assembly 250 within the storage device assembly 205. For example, the engagement apparatus 220 may be configured in the linear configuration, and therefore, move the head stack assembly 250 down into the storage device assembly 205.

As shown in FIG. 5, the system 200 may further include a coupling apparatus 238 (e.g., coupling structure) configured to hold a shaft of the head stack assembly 250 during coupling (e.g., screw fastening from the bottom of the storage device assembly 205) of the head stack assembly 250 to the storage device assembly 205 (e.g., to ensure the screw may achieve proper install torque without the head stack assembly 250 rotating freely).

After the head stack assembly 250 is placed within the storage device assembly 205, the output shaft apparatus 230 may release the head stack assembly 250 and move linearly (e.g., vertically) away from the storage device assembly 205 leaving the head stack assembly 250 positioned and/or coupled to the storage device assembly 205 (e.g., by moving the entire system 200 linearly, by moving the output shaft apparatus 230 linearly). The output shaft apparatus 230 may then move (e.g., rotationally to a "pick" position which moves the output shaft apparatus 230 and output extension 235 such that the output shaft apparatus 230 and output extension 235 may not interfere with the storage device assembly 205) to pick up a subsequent head stack assembly 250 while a subsequent storage device assembly 205 takes the place of the previous storage device assembly 205 (e.g., by conveyor belt, by robot, etc.), in which the subsequent head stack assembly 250 may be placed. The ability for the system 200 to move linearly to place the head stack assembly 250 may enable multiple products (e.g., head stack assemblies 250 positioned in storage device assemblies 205) to be built with the same system 200 with little or no user intervention or conversion.

The system 200 may also be configured to adjust the install position 255 of the head stack assembly 250 "on the fly" so as to reduce the potential for complications. For example, the rotational displacement and the linear displacement may be modified as the head stack assembly 250 is installed into the storage device assembly 205 to ensure a precise fitment of the head stack assembly 250 at the install position 255. Specifically, the system 200 may include a control apparatus 240 (e.g., as shown in FIG. 3) that is configured to control linear and rotational displacement as well as may be configured to provide, e.g., a control system, feedback, closed loop control, etc. to the system 200.

Another exemplary system 300 for positioning and/or coupling a fastener 350 (e.g., screws, fastening structures, etc.) relative to a storage device assembly 305 (e.g., a hard drive assembly) is illustrated in FIGS. 6-7. The system 300 may include a housing 301 (e.g., housing structure), one or more motors 310 (e.g., motor structures), and one or more output shaft apparatus 330 (e.g., output shaft structure). The output shaft apparatus 330 (e.g., output shaft structure) may include a plurality of driver bits 335 (e.g., driver bit structure), each extending along a longitudinal axis 302. As shown in FIG. 6, the output shaft apparatus 330 includes six driver bits 335 (only three of the driver bits 335 are visible in FIG. 6). Each of the driver bits 335 may be configured to move linearly along the corresponding longitudinal axis 302 and rotationally about the corresponding longitudinal axis 302 using the rotational force of the motors 310 (e.g., motor structures). As shown in FIG. 6, each of the driver bits 335 is independently coupled to one motor 310. In other words, each of the driver bits 335 may move linearly and rotationally independently from each other using a separate individual motor 310. However, in one or more embodiments, the driver bits 335 may move linearly and/or rotationally to the same degree and at the same time as each other.

Each driver bit 335 may be configured to drive the fastener 350 (e.g., a screw) into the storage device assembly 305 (e.g., hard drive assembly). In one or more embodiments, the system 300 including driver bits 335 configured to drive fasteners 350 may be described as an automatic screwdriver. To precisely align the driver bit 335 with the fastener 350 before installation, the system 300 may control the linear displacement of each driver bit 335 before being coupled to the corresponding fastener 350. In other words, the system 300 may be configured to adjust or "set up" the "bit stick-out" of the driver bit 335 at a specific distance. For example, the driver bit 335 may be positioned to engage the star, hexagonal, cross, slot, square, any suitable configuration, etc. recess in the fastener 350. Precisely positioning the driver bit 335 relative to the fastener 350 may prevent the driver bit 335 from "bottoming out," "over traveling," or "under traveling," which may potentially damage the driver bit 335 and/or the fastener 350. Once the driver bit 335 is positioned relative to a corresponding fastener 350 such that the driver bit 335 may be coupled to that fastener 350, the driver bit 335 may rotate about the longitudinal axis 302, thus rotating (e.g., torqueing) the fastener 350, and couple the fastener 350 to the assembly 305. The process of using a single motor 310 to move a driver bit 335 linearly and rotationally may reduce the subjectivity, difficulty, and complexity of setting up the "bit stick-out" of the driver bit 335. However, in one or more embodiments, the system 300 (e.g., the housing 301, the one or more motors 310, and the output shaft apparatus 330) may be configured or controllable to move (e.g., linearly, up/down, rotationally, etc.) to assist in positioning and/or coupling the fastener 350 relative to the storage device assembly 305. For example, the system 300 may move linearly to drive the fastener 350 into the assembly 305.

In addition to the driver bit 335 moving linearly to be aligned with the fastener 350, the driver bit 335 may be moved linearly as the driver bit 335 wears down over time through use. In other words, the driver bit 335 may reduce in size (e.g., "wear down"), and therefore, a linear adjustment may be made to better position the driver bit 335 in relation to the corresponding fastener 350 in view of the size reduction of the driver bit 335.

Further, on occasion the driver bit 335 may be replaced with a new driver bit 335 and the driver bit 335 being configured to move linearly along the longitudinal axis 302 may help with the replacement process. For example, the driver bit 335 may be moved linearly for better access to remove an old driver bit 335 and a new driver bit 335 may need to be adjusted linearly to a specific position after being loaded into the system 300.

In one or more embodiments, the driver bits 335 may be described as being configured to rotate all the way around (e.g., 360 degrees) in both directions about the corresponding longitudinal axis 302. In one or more embodiments, the driver bits 335 may be described as being configured to move linearly in either direction along the longitudinal axis 302 by, e.g., greater than or equal to about 0 mm, greater than or equal to about 0.25 mm, greater than or equal to about 0.5 mm, greater than or equal to about 1 mm, greater than or equal to about 2 mm, greater than or equal to about 4 mm, greater than or equal to about 6 mm, etc. and/or less than or equal to about 15 mm, less than or equal to about 12 mm, less than or equal to about 10 mm, less than or equal to about 7 mm, less than or equal to about 5 mm, less than or equal to about 4 mm, less than or equal to about 3 mm, etc.

As shown in FIG. 7, the system 300 may also include an engagement apparatus 330 (e.g., engagement structure) coupling the motor 310 to the driver bit 335. The engagement apparatus 330 may be configurable between a linear configuration to control a height of the driver bit 335 relative to the fastener 350 and a rotational configuration to drive the fastener 350 into the assembly 305 using the driver bit 335. In one or more embodiments, the engagement apparatus 320 may be pre-disposed in the rotational configuration to rotationally move the fastener 350 to couple the fastener 350 to the storage device assembly 305. For example, the engagement apparatus 320 may be described as being configured in the rotational configuration to rotationally move the fastener 350, e.g., as a default configuration, without external input, as a natural state, etc.

The engagement apparatus 330 may include a first portion 322, a second portion 324, and a switch apparatus 360 (e.g., switch structure). In one or more embodiments, the switch apparatus 360 may be described as a push-button lockout, the first portion 322 may be described as an inner coupling, and the second portion 324 may be described as an outer coupling. The first portion 332 may be fixedly coupled to the motor 310, the second portion 324 may be fixedly coupled to the driver bit 335, and the first and second portions 322, 324 may interact through, e.g., threaded surfaces or couplings of each.

The switch apparatus 360 may be configured to toggle between being engaged and disengaged. When the engagement apparatus 320 is configured in the rotational configuration, the switch apparatus 360 may be disengaged and when the engagement apparatus 320 is configured in the linear configuration, the switch apparatus 360 may be engaged. Specifically, when the switch apparatus 360 is engaged, the second portion 324 (e.g., the outer coupling) of the engagement apparatus 320 may be restricted from rotation while the motor 310 rotates the first portion 322 (e.g., the inner coupling) of the engagement apparatus 320 mating the threaded surfaces of the first and second portions 322, 324, which linearly adjusts the second portion 324 (e.g., the outer coupling) of the engagement apparatus 320, and thus the driver bit 335. The switch apparatus 360 may be engaged/disengaged manually through a user input or automatically through, e.g., an air cylinder, a linear actuator, a robot, etc.

Furthermore, when the switch apparatus 360 is disengaged, the first and second portions 322, 324 of the engagement apparatus 320 rotate together, which rotationally adjusts the second portion 324 of the engagement apparatus 320, and thus the driver bit 335. The first and second portions 322, 324 of the engagement apparatus 320 rotate together due to a clutch mechanism 339 that, e.g., may be spring loaded, and may ensure that the first and second portions 322, 324 of the engagement apparatus 320 rotate together. However, when the switch apparatus 360 is engaged to restrict rotation of the second portion 324 (e.g., the outer coupling) of the engagement apparatus 320, the clutch mechanism 339 may be "overridden" by the switch apparatus 360 and the first portion 322 (e.g., the inner coupling) of the engagement apparatus 320 may be allowed to rotate relative to the second portion 324. As the first portion 322 of the engagement apparatus 320 rotates, the clutch mechanism 339 may be described as "slipping" and/or audibly "clicking" when the engagement apparatus 320 is in the linear configuration (e.g., when the switch apparatus 360 is engaged).

The system 300 may further include a control apparatus 340 (e.g., control structure) that monitors and measures linear displacement and rotational displacement of the driver bit 335 relative to the fastener 350, e.g., in real-time. In other words, the control apparatus 340 may be configured to determine the exact location of the driver bit 335 within the system 300. In one or more embodiments, the control apparatus 340 may be described as including an encoder that detects bit height. The control apparatus 340 may also be configured to control the linear movement and the rotational movement of the driver bit 335 based on at least the measured linear displacement and the measured rotational displacement. In one or more embodiments, the system 300 may include a control apparatus 340 that monitors and measures the linear displacement and rotational displacement of each of the driver bits 335 and configured to control the linear and rotational movement for each of the driver bits 335 independently based on the measured linear and rotational displacement.

The linear displacement of the driver bit 335 may also be adjusted by a user manually manipulating (e.g., rotating) the first portion 322 (e.g., the inner coupling) of the engagement apparatus 320 when in the linear configuration (e.g., when the switch apparatus 360 is engaged, while the second portion is held still, etc.). As the first portion 322 (e.g., the inner coupling) of the engagement apparatus 320 is rotated, the clutch mechanism 339 may "click," indicating that the first portion 322 of the engagement apparatus 320 has rotated a specific amount resulting in a linear displacement of the second portion 324 and the driver bit 335. By counting the "clicks," a user may determine and adjust the linear displacement of the driver bit 335.

Figure 8:
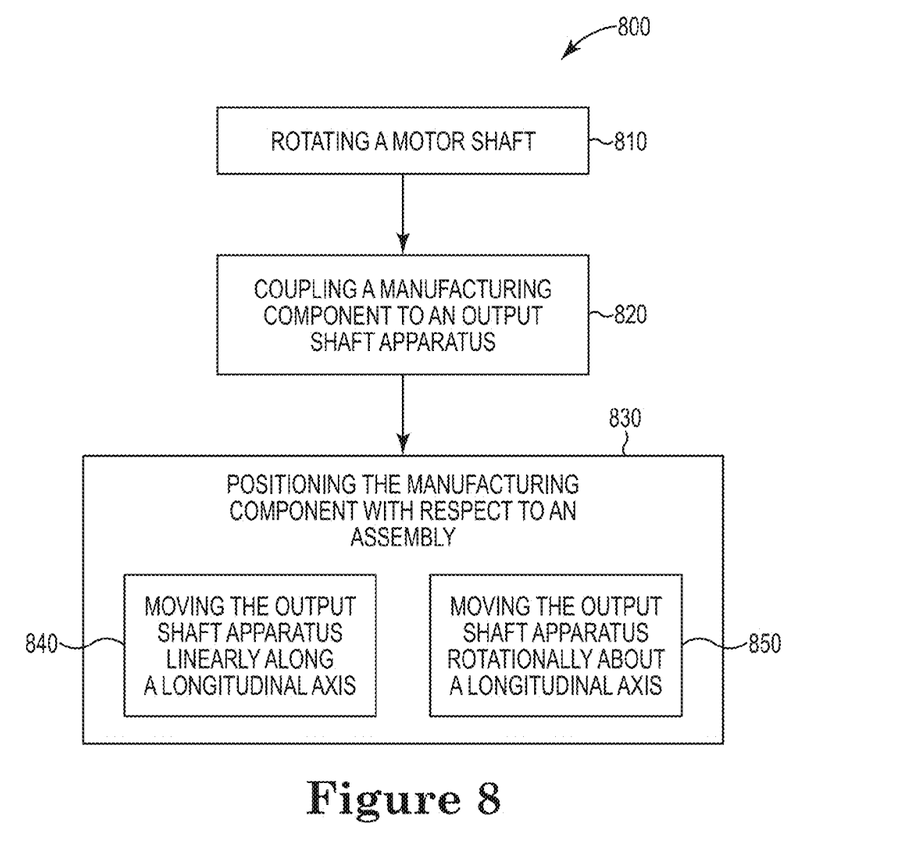
FIG. 8 is a block diagram of an exemplary method of positioning a manufacturing component using one of the exemplary embodiments shown in FIGS. 1-7.

A method of positioning a manufacturing component using a motor is illustrated in FIG. 8. The method may include rotating 810 a motor shaft of the motor to provide a rotational force. The method may also include coupling 820 (e.g., removably coupling) the manufacturing component to an output shaft apparatus that extends along a longitudinal axis. Further, the method may include positioning 830 the manufacturing component with respect to an assembly using the motor shaft of the motor for coupling the manufacturing component to the assembly. The positioning 830 the manufacturing component may include moving 840 the output shaft apparatus linearly along the longitudinal axis using the rotational force provided by the motor shaft to linearly move the manufacturing component. The positioning 830 the manufacturing component may also include moving 850 the output shaft apparatus rotationally about the longitudinal axis using the rotational force provided by the motor shaft to rotationally move the manufacturing component.

In one or more embodiments, the method may also include coupling the manufacturing component to the assembly using the rotational force provided by the motor shaft. In one or more embodiments, the method may include measuring linear displacement and rotational displacement of the output shaft apparatus using a control apparatus. The method may also include controlling linear movement and rotational movement of the output shaft apparatus using the control apparatus based on the measured linear displacement and measured rotational displacement.

In one or more embodiments, the method may further include translating the rotational force provided by the motor shaft to the output shaft apparatus using an engagement apparatus. The engagement apparatus may include a first portion fixedly coupled to the motor shaft and a second portion fixedly coupled to the output shaft apparatus. The first portion may be fixedly coupled to the second portion when the output shaft apparatus is rotationally movable about the longitudinal axis using the rotational force provided by the motor shaft and the first portion may be rotatable in relation to the second portion when the output shaft apparatus is linearly movable along the longitudinal axis using the rotational force provided by the motor shaft.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top," "bottom," "above," "below," etc. may be used in this disclosure. These terms should not be construed as limiting the position or orientation of a structure, but should be used as providing spatial relationship between the structures.

Embodiments of the systems, apparatus, structures, devices, and methods are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A system comprising:
   a motor comprising a motor shaft configured to provide rotational force;
   an output shaft apparatus extending along a longitudinal axis and configured to be removably couplable to a manufacturing component and to at least position the manufacturing component with respect to an assembly using the motor for coupling the manufacturing component to the assembly; and
   an engagement apparatus coupling the motor to the output shaft apparatus and configurable between a linear configuration and a rotational configuration,
   wherein the output shaft apparatus is linearly movable along the longitudinal axis using the rotational force provided by the motor shaft when the engagement apparatus is configured in the linear configuration and the output shaft apparatus is rotationally movable about the longitudinal axis using the rotational force provided by the motor shaft when the engagement apparatus is configured in the rotational configuration.

2. The system of claim 1, wherein the assembly comprises a hard drive assembly and the manufacturing component comprises a head stack assembly configured to be coupled to the hard drive assembly, wherein the output shaft apparatus is configured to be removably couplable to the head stack assembly and to at least position the head stack assembly with respect to the hard drive assembly prior to the head stack assembly being coupled to the hard drive assembly, wherein the engagement apparatus is pre-disposed in the linear configuration to linearly move the head stack assembly.

3. The system of claim 2, wherein the output shaft apparatus comprises a head stack fork configured to be removably couplable to the head stack assembly.

4. The system of claim 1, wherein the assembly comprises a storage device assembly and the manufacturing component comprises a fastener configured to be coupled to the storage device assembly, wherein the output shaft apparatus comprises a driver bit configured to be removably couplable to the fastener and to at least position the fastener with respect to the storage device assembly for a bit stick-out adjustment, wherein the engagement apparatus is predisposed in the rotational configuration to rotationally move the fastener to couple the fastener to the storage device assembly.

5. The system of claim 1, wherein the engagement apparatus comprises a first portion fixedly coupled to the motor shaft and a second portion fixedly coupled to the output shaft apparatus, wherein the first portion is fixedly coupled to the second portion when the engagement apparatus is configured in the rotational configuration and the first portion is rotatable in relation to the second portion when the engagement apparatus is configured in the linear configuration.

6. The system of claim 5, wherein the engagement apparatus comprises a switch apparatus configured to selectively fixedly couple the first portion to the second portion to configure the engagement apparatus in the rotational configuration.

7. The system of claim 5, wherein the engagement apparatus comprises a switch apparatus configured to selectively restrict rotation of the second portion relative to the first portion to configure the engagement apparatus in the linear configuration.

8. The system of claim 1, wherein the output shaft apparatus extends along the longitudinal axis from a proximal region proximate the engagement apparatus to a distal region farther from the engagement apparatus than the proximal region, wherein the manufacturing component is coupled to the output shaft apparatus closer to the distal region than the proximal region.

9. The system of claim 1, further comprising a control apparatus configured to measure linear displacement of the output shaft apparatus when the engagement apparatus is configured in the linear configuration and measure rotational displacement of the output shaft apparatus when the engagement apparatus is configured in the rotational configuration, wherein the control apparatus is further configured to control the linear movement and the rotational movement of the output shaft apparatus based on at least the measured linear displacement and measured rotational displacement.

10. The system of claim 1, wherein the engagement apparatus comprises a spring configured to provide at least some linear compliance for the output shaft apparatus along the longitudinal axis.

\* \* \* \* \*